US011524465B2

(12) United States Patent
Gallo et al.

(10) Patent No.: US 11,524,465 B2
(45) Date of Patent: Dec. 13, 2022

(54) ELECTROMAGNETIC INDUCTION WELDING DEVICE FOR JOINING COMPOSITE MATERIALS AND RELATIVE JOINING METHOD

(71) Applicant: LEONARDO S.p.A., Rome (IT)

(72) Inventors: Nicola Gallo, Grottaglie (IT); Stefano Giuseppe Corvaglia, Grottaglie (IT); Silvio Pappada, Grottaglie (IT)

(73) Assignee: LEONARDO S.P.A, Rome (IT)

( * ) Notice: Subject to any disclaimer, the term of this patent is extended or adjusted under 35 U.S.C. 154(b) by 224 days.

(21) Appl. No.: 16/718,604

(22) Filed: Dec. 18, 2019

(65) Prior Publication Data

US 2020/0198258 A1 Jun. 25, 2020

(30) Foreign Application Priority Data

Dec. 20, 2018 (IT) .................. 102018000020524

(51) Int. Cl.
*B29C 65/00* (2006.01)
*B29C 65/36* (2006.01)
(Continued)

(52) U.S. Cl.
CPC ........ *B29C 66/1122* (2013.01); *B29C 65/368* (2013.01); *B29C 65/32* (2013.01);
(Continued)

(58) Field of Classification Search
CPC ... B29C 65/3668; B29C 65/32; B29C 65/368; B29C 66/1122; B29C 66/71;
(Continued)

(56) References Cited

U.S. PATENT DOCUMENTS 4,569,716 A * 2/1986 Pugh .................. B29C 65/1464
156/510
4,992,133 A 2/1991 Border
(Continued)

FOREIGN PATENT DOCUMENTS

EP 2801472 A1 * 11/2014 ......... B29C 65/3608

OTHER PUBLICATIONS

Italian Search Report and Written Opinion issued by Ministero dello Sviluppo Economico for Italian Application No. IT201800020524, dated Aug. 7, 2019, pp. 1-10.
(Continued)

*Primary Examiner* — Daniel McNally
(74) *Attorney, Agent, or Firm* — The Belles Group, P.C.

(57) ABSTRACT

A portable welding device comprising: a base facing a work surface, designed to receive tapes in electrically conductive composite materials to be joined or defined by at least one already positioned tape; an operating head receiving one tape at a time and movable with respect to the base along at least a first movement line parallel to the work surface; a motorized arm connecting the operating head to the base and selectively activatable to impart movements to the operating head; and feeding means selectively activatable to feed one tape at a time to the operating head and connected to the operating head; the operating head comprises a positioning roller receiving a tape at a time; a pressure roller spaced from and aligned with the positioning roller along the first movement line; and an inductor interposed between the positioning roller and the pressure roller with reference to the first movement line.

8 Claims, 3 Drawing Sheets

(51) Int. Cl.
B29C 65/32 (2006.01)
B29C 35/08 (2006.01)

(52) U.S. Cl.
CPC .......... *B29C 65/3668* (2013.01); *B29C 66/71* (2013.01); *B29C 2035/0811* (2013.01); *B29K 2995/0008* (2013.01); *B29K 2995/0013* (2013.01)

(58) Field of Classification Search
CPC .... B29C 2035/0811; B29K 2995/0013; B29K 2995/0008
See application file for complete search history.

(56) References Cited

U.S. PATENT DOCUMENTS

| 9,527,237 | B2 | 12/2016 | Benson et al. |
| 2008/0196825 | A1* | 8/2008 | Hamlyn ................ B29C 70/382 156/232 |
| 2008/0202691 | A1 | 8/2008 | Hamlyn |
| 2009/0229760 | A1 | 9/2009 | Hamlyn |
| 2009/0311506 | A1 | 12/2009 | Herbeck et al. |
| 2010/0206469 | A1* | 8/2010 | Van Wijngaarden ................ B29C 66/8242 156/245 |
| 2011/0272126 | A1* | 11/2011 | Hamlyn ................ B29C 70/382 165/177 |
| 2014/0110054 | A1 | 4/2014 | Shigihara et al. |
| 2014/0190629 | A1* | 7/2014 | Benson ............... B29C 65/1403 156/272.2 |

OTHER PUBLICATIONS

Gillespie et al., Advanced Material Intelligent Processing Center: Next Generation Scalable Lean Manufacturing, 96 Pages, Sep. 4, 2012, Office of Naval Research Grant Grant No. N000140911011, URL: https://apps.dtic.mil/sti/pdfs/ADA564963.pdf.

Gurgul M., Industrial robots and cobots: Everything you need to know about your future co-worker, 243 Pages, Dec. 8, 2018, URL:https://www.amazon.com/Industrial-robots-cobots-Everything-co-worker-ebook/dp/B07L7N7JG6.

Shevchenko et al., Rapid Automated Induction Lamination (RAIL) for High-Volume Production of Carbon/Thermoplastic Laminates, 48 pages, May 2001, Army Research Laboratory Report,URL: https://apps.dtic.mil/dtic/tr/fulltext/u2/a390864.pdf.

\* cited by examiner

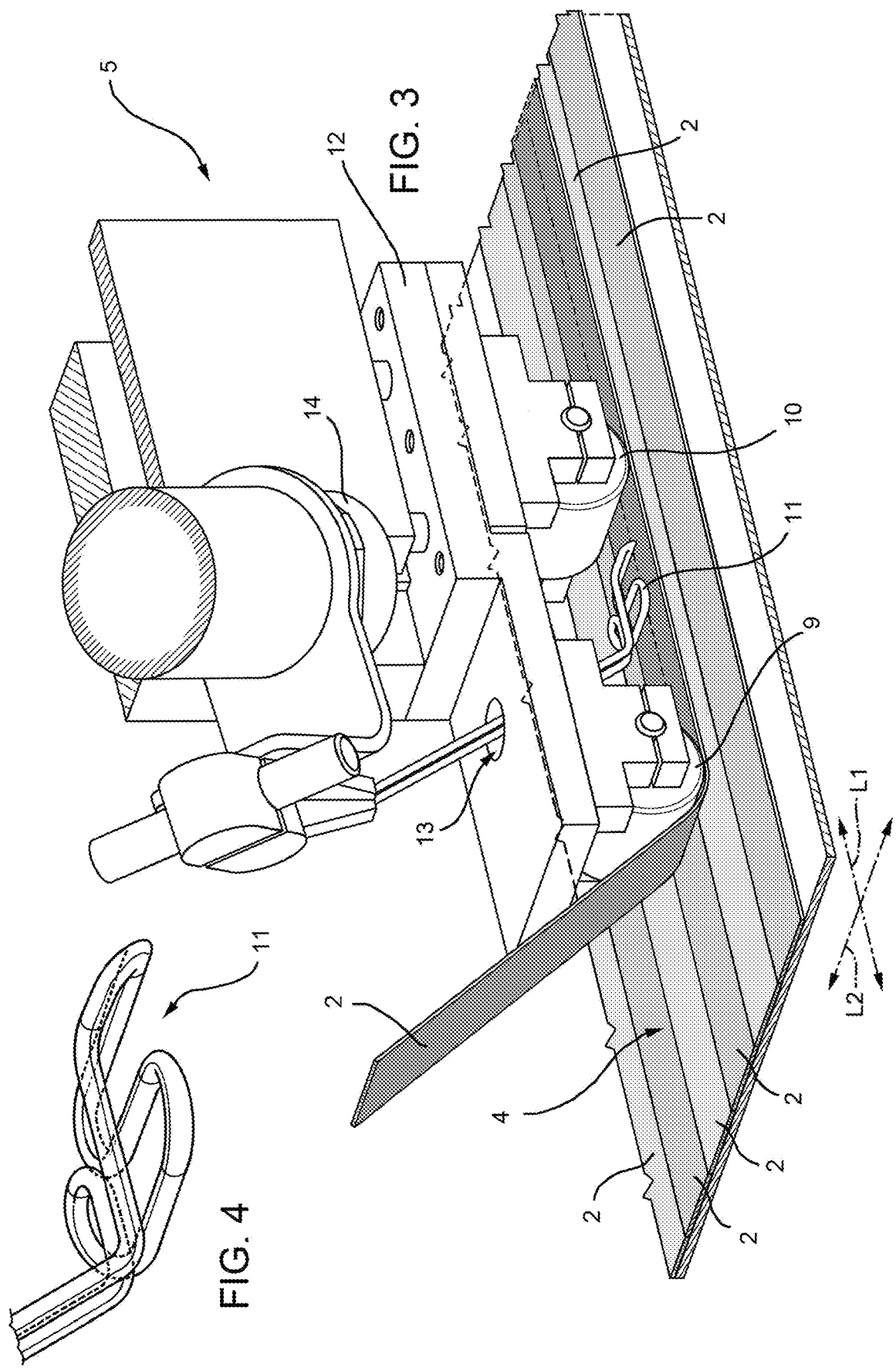

ELECTROMAGNETIC INDUCTION WELDING DEVICE FOR JOINING COMPOSITE MATERIALS AND RELATIVE JOINING METHOD

CROSS-REFERENCE TO RELATED APPLICATIONS

This patent application claims priority from Italian patent application no. 102018000020524 filed on Dec. 20, 2018, the entire disclosure of which is incorporated herein by reference.

TECHNICAL FIELD

The present invention relates to a portable electromagnetic induction welding device for joining composite materials, in particular for aeronautic applications, to which the ensuing description will make explicit reference, without any loss of generality.

The present invention also relates to a method for joining composite materials by means of the aforementioned electromagnetic induction welding device.

BACKGROUND

As is known, composite materials are used in various industrial sectors, including the aviation industry. In particular, fibre-reinforced composite materials, commonly referred to as "pre-impregnated" or "prepreg", are known, which are generally constituted by a semi-finished product comprising a resin matrix and reinforcing fibres immersed in the matrix. The fibres can be arranged in different configurations, for example, in a single direction, in two or more mutually different directions, or can be arranged to form a fabric. The matrix is used to fix the fibres to each other and possibly to other components during production.

Prepregs are generally prepared in the form of tapes and wound in rolls; in order to achieve the desired mechanical properties, prepregs must be subjected to a stabilization process through heat and often also under pressure.

The prepregs mainly used in the aviation industry can have a matrix of a thermosetting material or of a thermoplastic material.

In the first case (thermosetting materials), the matrix is constituted by polymers that, in opportune temperature conditions and/or in the presence of certain substances, transform into rigid, insoluble and infusible materials. This transformation occurs following cross-linkage reactions (a process known as curing, through which polymer chains undergo a reaction that creates bonds between different chains at a reactive functional group level), which take place between the polymer chains with formation of strong (covalent or ionic) bonds.

Before polymerization, thermosetting materials have characteristics of stickiness. These materials can therefore be used to create stratifications, placing different layers one on top of the other, with an opportune sequence or orienting of the different layers. The stratifications are then subjected to a temperature and pressure cycle (in a vacuum bag and in autoclave, using ovens, moulding presses, etc.) which polymerizes the material, raising the molecular weight and inducing the creation of bonds between the macro-molecules (cross-linking), thus transforming it into a material with structural characteristics and mechanical properties suitable for its intended application.

Some thermosetting polymers are cross-linked only by heat or through a combination of pressure and heat, while others can be cross-linked through chemical reactions at room temperature (cold cross-linking).

In the second case (thermoplastic materials), the matrix resin has a high molecular weight and therefore, on one hand, it does not need to undergo a polymerization cycle, and on the other, does not have characteristics of stickiness.

In a first approximation, a thermoplastic-matrix prepreg can be considered a manufactured product in its final state formed by a single lamina. To be able to form a laminate, it is necessary to heat it so as to cause the fusion of at least the contact surfaces of its constituent laminae or layers of thermoplastic prepreg, compress it and then cool it. The temperature to be reached for fusion is the glass transition temperature $T_g$ for amorphous thermoplastics, and the melting point $T_f$ for semi-crystalline thermoplastics.

In these cases, the apparatus for producing a laminate based on thermoplastic prepregs must also provide the heat for reaching a temperature (which, depending on the materials, might be excessively high) such as to melt the resin and thus obtain adhesion between the various layers that will constitute the laminate; in addition, for semi-crystalline thermoplastics, cooling that is too rapid might cause amorphisation of the part, with consequent loss of performance characteristics.

As previously explained, the processes of stabilization of the prepregs and of joining the various prepreg layers that form the final component usually take place in an autoclave, in ovens or moulding presses. In the case of very large components, such as, for example, structural components in the aeronautics sector, naval sector, etc., the known stabilization and joining processes are excessively expensive and can create numerous undesired constraints.

The need is thus felt to develop techniques that allow achieving in-situ stabilization and joining of parts in a composite material, especially when these are very large in size.

DESCRIPTION OF INVENTION

One object of the present invention is to produce a welding device for joining composite materials that enables meeting the aforementioned need and, at the same time, enables achieving high-quality welds.

According to the present invention, a portable welding device is provided as claimed in claim 1 and in its dependent claims.

The present invention also relates to a method of joining composite materials as claimed in claim 10.

BRIEF DESCRIPTION OF THE DRAWINGS

The present invention will now be described with reference to the accompanying drawings, which show a non-limiting embodiment thereof, in which:

FIG. 3 is perspective view, on a further enlarged scale, of the detail of FIG. 2, with parts removed for the sake of clarity; and FIG. 4 is a perspective view on an enlarged scale of a detail of FIG. 3.

PREFERRED EMBODIMENT OF THE INVENTION

Figure 1:
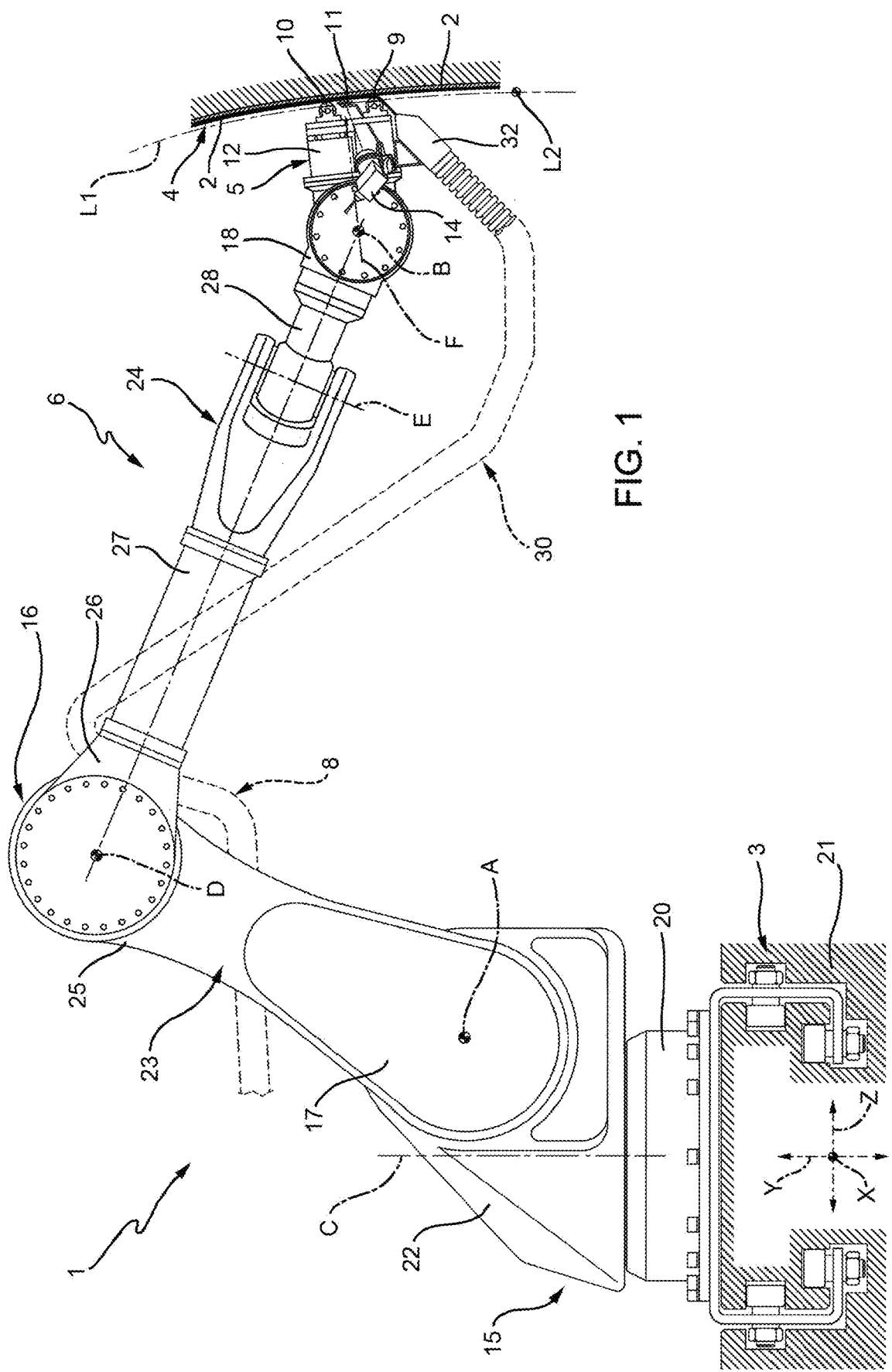
FIG. 1 is a side elevation view, with parts removed for the sake of clarity, of a portable electromagnetic induction welding device made according to the present invention for joining tapes of adherends in electrically conductive composite materials with a polymeric matrix.

FIG. 1 shows a portable electromagnetic induction welding device, indicated as a whole by 1, for joining together tapes 2 of adherends in electrically conductive composite materials with a polymeric matrix.

In particular, the tapes 2 used generally comprise a resin-based matrix in which reinforcing fibres, suitable for giving special mechanical properties to the composite material, and electrically conductive fibres, in which mainly parasitic electric currents can be induced by the welding device 1, are dispersed.

The matrix can be thermoplastic, semi-crystalline or amorphous resin based, or thermosetting resin based.

In the first case, the semi-crystalline thermoplastic resin can, for example, be polyether ether ketone, or PEEK, which has a melting point $T_f$ of approximately 340° C. In alternative, this semi-crystalline thermoplastic resin can, for example, be polyether ketone ketone, or PEKK, which has a melting point $T_f$ of approximately 370° C. An example of amorphous thermoplastic resin is represented, for example, by polyetherimide, or PEI, which has a glass transition temperature $T_g$ of approximately 215° C.

In the case where a thermosetting resin is used, the latter can, for example, be an epoxy, BMI (bismaleimide) or phenolic resin.

The reinforcing fibres can be arranged in one or more unidirectional layers, in several layers having different orientations from each other, or like a fabric.

The reinforcing fibres are preferably in carbon; in alternative, other types of reinforcing fibres known in the aeronautics sector can be used, such as, for example, glass fibres or a combination of glass and carbon fibres.

The electrically conductive fibres are preferably in carbon and are dispersed in the matrix in at least two different directions, preferably in a random manner in all directions; in alternative, the electrically conductive fibres can also be made in another conductive material, for example in a metal material.

Figure 2:
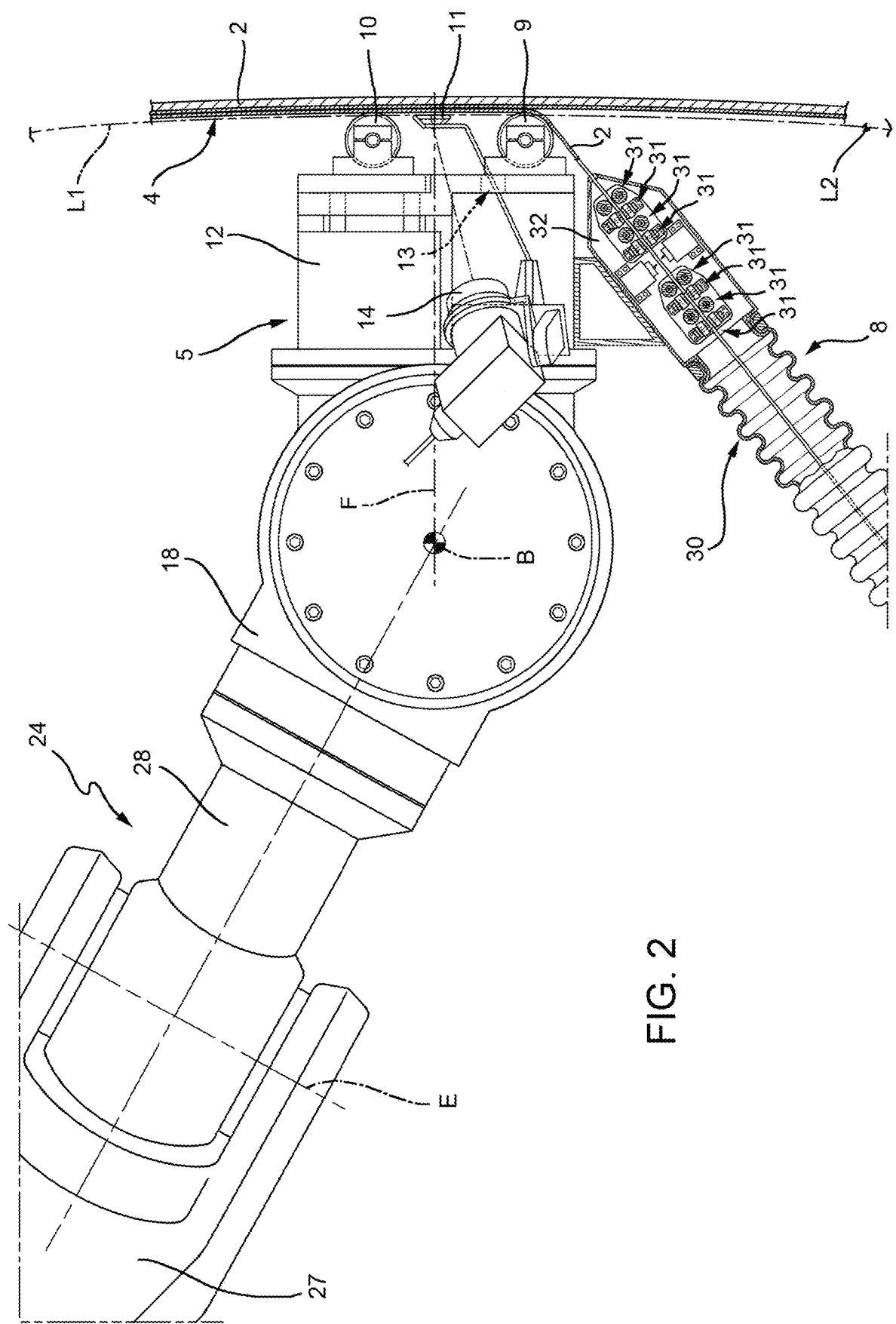
FIG. 2 is perspective view on an enlarged scale of a detail of FIG. 1, with parts removed for the sake of clarity.

Referring to the FIGS. 1 to 3, the welding device 1 comprises:

a fixed base 3, facing a work surface 4, which in turn is designed to receive the tapes 2 to be joined or is defined by at least one tape 2 already positioned to receive one or more other tapes 2;

an operating head 5, receiving one tape 2 at a time and movable with respect to the base 3 along at least a first movement line L1 parallel to the work surface 4 for stretching the received tape 2 on the work surface 4;

a motorized arm 6 connecting the operating head 5 to the base and selectively activatable to impart movements to the operating head 5 parallel to the movement line L1 and also parallel to at least a further movement line L2 transversal to the movement line L1 and parallel to the work surface 4; and a feeding means 8 selectively activatable to feed one tape 2 at a time to the operating head 5 and connected to the operating head 5.

In particular, the movements of the operating head 5 along the movement line L1 are preferably used for stretching the respective tape 2, fed to the operating head 5, along the work surface 4. The movements of the operating head 5 along the movement line L2 are preferably used for moving the operating head 5 in an area of the work surface 4 adjacent and parallel to that of the tape 2 just applied.

In detail, the operating head 5 comprises at least one positioning roller 9, receiving one tape 2 at a time from the feeding means 8 and adapted to deviate this tape 2 on the work surface 4, at least one pressure roller 10, spaced from and aligned with the positioning roller 9 along the movement line L1, and at least one inductor 11, interposed between the positioning roller 9 and the pressure roller 10 referring to the movement line L1 and selectively energized, in use, to generate an electromagnetic field suitable for inducing parasitic electric currents in the tapes 2 overlapping each other so as to produce, by the Joule effect, the local fusion of polymer matrices in contact with each other of the tapes 2.

The positioning roller 9 is arranged downstream of the pressure roller 10 along the feeding direction of the operating head 5 parallel to the movement line L1.

According to a possible alternative that is not shown, the operating head 5 could also comprise two or more positioning rollers 9 and two or more pressure rollers 10.

In greater detail, the operating head 5 comprises a carriage 12 provided with positioning and pressure rollers 9, 10 and sliding on the work surface 4.

In the case shown (FIG. 4), the inductor 11 is constituted by a winding of conductive material, normally copper wire, covered by a thin insulation film. Alternatively, the inductor 11 can also be defined by a coil.

The inductor 11 is preferably housed in a seat 13 passing through the carriage 12 and protrudes therefrom to interact with the tapes 2 to be joined during the sliding of carriage 12 on the work surface 4.

As can be seen in particular in the FIGS. 1 to 3, the operating head 5 also comprises a heat sensor 14, preferably a heat camera, mounted in a cantilever fashion on the carriage 12, and configured and positioned on the carriage 12 so as to frame the work area of the inductor 11 and remotely detect the temperature reached on the matrices of the tapes 2 to be joined.

Referring to the FIGS. 1 and 2, the motorized arm 6 comprises:

a slider 15 coupled movably to the base 3 parallel to a horizontal direction X, in turn parallel to the work surface 4 and, in the case shown, transversal to the movement line L1; and an articulation element 16, having a first end portion 17 hinged to the slider 15 about a first horizontal axis A parallel to the direction X, and a second end portion 18 hinged to the operating head 5 about a second axis B parallel to the axis A and to the direction X.

More specifically, the slider 15 comprises a supporting portion 20, slidably coupled along the direction X to a guide element 21 of the base 3, and a movable portion 22 coupled to the supporting portion 20 in a rotatable manner about a vertical axis C orthogonal to the axes A and B and to the direction X.

The articulation element 16 comprises a first connection member 23, defining the end portion 17, and a second connection member 24, defining the end portion 18; the connection members 23, 24 are then hinged to one another around an axis D, parallel to the axes A and B, at their respective concurrent end portions 25, 26, respectively opposite to the end portions 17, 18.

In greater detail, the connection member 23 is defined by a single lever hinged on one end to the movable portion 22 of the slider 15 and on the other end to the connection member 24.

As can be seen in FIGS. 1 and 2, the connection member 24 comprises a first lever 27, hinged to the connection member 23 about the axis D, and a second lever 28, hinged to the operating head 5 about the axis B; the two levers 27, 28 are then hinged to one another around an axis E orthogonal to the axes A, B and D.

Always referring to FIGS. 1 and 2, it can be noted how the operating head 5 is also coupled to the end portion 18 of the articulation element 16, and more specifically to the lever 28, about an axis F, transversal, and more specifically orthogonal, to the work surface 4, as well as orthogonal to the axes A, B and D and passing through the operating head 5.

The feeding means 8 basically comprise a roll (in itself known and not shown) of the tape 2, unrolling means (in themselves also known and not shown) for unrolling the tape 2 from the roll, and a flexible conduit 30, extending around the motorized arm 6 and internally carrying a plurality of guide rollers 31 of the tape 2 to be fed to the operating head 5; a downstream end 32 of the flexible conduit 30 is laterally fixed to the operating head 5 in a position adjacent to the positioning roller 9.

In use, due to the translation of the slider 15 along the guide element 21, the motorized arm 6, and with it the operating head 5, can move along the horizontal direction X.

Whereas, due to the rotations of the first connection member 23, the second connection member 24 and the operating head 5 about the respective axes A, B and D, it is possible to obtain the movement of the operating head 5 along two other directions Y, Z orthogonal to the direction X, thereby creating complex movements resulting from the combination of movements along the directions X, Y, Z; direction Y extends vertically and parallel to the axis C, while the direction Z extends horizontally.

The rotation about the axis F enables the operating head 5 to proceed in stretching the respective tape 2 on the work surface 4 along the movement lines L1 arranged according to any orientation with respect to the work surface 4.

The rotation about the axis C enables the operating head 5 to work on any work surface 4, flat or curved, arranged in any position around the axis C.

The welding device 1 is suitable for being used not only for welding tapes 2 of composite materials to each other, but also for progressively stretching these tapes 2 on a predetermined work surface 4, i.e. on a surface intended to receive these tapes 2 or defined by one or more already positioned tapes 2.

Once the device 1 has been positioned near the work surface 4 on which it must operate, a tape 2 is fed from the respective roll inside the conduit 30, to then come out from the latter at the downstream end 32 and be received by the positioning roller 9 of the operating head 5. In the meanwhile, the operating head 5 is fed by the motorized arm 6 along the movement line L1.

During this operation, in order to join the tape 2 just stretched on the underlying tape 2, the inductor 11 is fed with an electric current so as to generate a variable electromagnetic field E suitable for inducing the parasitic currents largely in the electrically conductive fibres in the matrices of the tapes 2 to be joined.

Since the electrically conductive fibres are dispersed in the respective matrices in at least two different directions, actual "electrical circuits" are created inside the matrices that heat them by the Joule effect.

The localized heating is very efficient and enables reaching and locally exceeding, i.e. in the contact areas between the matrices of the two tapes 2, the melting point $T_f$ or the glass transition temperature $T_g$.

Due to the arrangement of the positioning and pressure rollers 9, 10 on the carriage 12, the passage of the pressure roller 10 takes place after the induction of parasitic currents in the overlaid tapes 2.

In this way, the pressure is progressively exerted on the areas of the tapes 2 to be joined, after the softening obtained at the interface between the tapes 2 following electromagnet induction and during the cooling of these areas.

Preferably, at least the pressure roller 10 is kept cold so as to progressively remove residual heat from the tapes 2.

From an examination of the characteristics of the welding device 1 and of the joining method realized according to the dictates of the present invention, the advantages that can achieved therewith are evident.

In particular, the welding device 1 is suitable for in-situ operation, both for stabilizing composite materials and for joining several layers or laminae of composite materials.

Due to the versatility of movement of the motorized arm 6 and the particular configuration of the operating head 5, the welding device 1 is suitable for processing surfaces or parts of any shape, flat or curved or a combination thereof, in an efficient and particularly rapid manner.

Finally, it is clear that modifications and variants can be made to the welding device 1 and the joining method set forth herein without departing from the scope defined in the claims.

The invention claimed is:

1. A portable electromagnetic induction welding device for joining tapes of adherends in electrically conductive composite materials with a polymeric matrix, said device comprising:
  a base facing a work surface, in turn designed to receive said tapes of adherends to be joined or defined by at least one tape of adherend already positioned to receive one or more other tapes of adherends;
  an operating head receiving one tape of adherend at a time and movable with respect to said base along at least a first movement line (L1) parallel to said work surface for stretching the received tape of adherend on the work surface;
  a motorized arm connecting said operating head to said base and selectively activatable to impart movements to the operating head parallel to said first movement line (L1) and also parallel to at least a second movement line (L2) transversal to the first movement line (L1) and parallel to said work surface; and
  feeding means selectively activatable to feed one tape of adherend at a time to said operating head and connected to the operating head;
  wherein said operating head comprises:
  at least one positioning roller receiving one tape of adherend at a time from said feeding means;
  at least one pressure roller spaced from and aligned with said positioning roller along said first movement line (L1); and
  at least one inductor interposed between, and spaced from, said positioning roller and said pressure roller with reference to said first movement line (L1) and selectively energized in use to generate an electromagnetic field suitable for inducing parasitic electric currents in said tapes of overlapped adherends so as to produce, by the Joule effect, the local fusion of polymeric matrices in contact with each other of the tapes of adherends.

2. The device according to claim 1, wherein said articulation element comprises a first connection member, defining said first end portion, and a second connection member defining said second end portion; and wherein said first and second connection members are hinged to one another around a fourth axis (D), parallel to said first and second axes (A, B), and at their concurrent end portions, respectively opposite said first and second end portions.

3. The device according to claim 2, wherein said second connection member comprises a first lever, hinged to said first connection member about said fourth axis (D), and a second lever, hinged to said operating head around said second axis (B), and wherein said first and second levers are hinged to one another around a fifth axis (E) orthogonal to said first, second and fourth axes (A, B, D).

4. The device according to claim 1, wherein said operating head comprises a carriage provided with said positioning and pressure rollers and sliding on said work surface.

5. The device according to claim 4, wherein said inductor is housed in a seat passing through said carriage and protrudes therefrom to interact with the tapes of adherends to be joined.

6. The device according to claim 1, wherein said slider (15) comprises a supporting portion, slidably coupled along said first direction (X) to a guide element of said base, and a movable portion coupled to said supporting portion in a rotatable manner about a third vertical axis (C) orthogonal to said first and second axes (A, B) and to said first direction (X).

7. The device according to claim 1, wherein said operating head is also coupled to said second end portion of said articulation element around a sixth axis (F) transversal to said work surface, orthogonal to said first and second axes (A, B) and passing through the operating head.

8. The device according to claim 1, wherein said feeding means comprise a flexible conduit extending around said motorized arm and internally bearing guide means for guiding the tape of adherend to be fed to said operating head, and wherein a downstream end of said conduit is fixed to said operating head in a position adjacent to said positioning roller.

* * * * *